United States Patent

Yamamoto et al.

[15] 3,652,988

[45] Mar. 28, 1972

[54] LOGICAL SYSTEM DETECTABLE OF FAULT OF ANY LOGICAL ELEMENT THEREIN

[72] Inventors: Hideo Yamamoto, Sagamihara; Teruji Watanabe, Niza-Machi, both of Japan

[73] Assignee: Kokusai Denshin Denwa Kabushiki Kaisha, Tokyo-to, Japan

[22] Filed: July 14, 1970

[21] Appl. No.: 54,685

[30] Foreign Application Priority Data

July 16, 1969 Japan....................................44/55740

[52] U.S. Cl.......................................................340/146.1AB

[51] Int. Cl.........................................................G08c 25/00

[58] Field of Search................................340/146.1; 235/153

[56] References Cited

UNITED STATES PATENTS 3,134,961 5/1964 Clark..............................340/146.1 X 3,292,147 12/1966 Dascotte.............................340/146.1

3,420,991 1/1969 Ling.......................................235/153

OTHER PUBLICATIONS

Sellers, Hsiao, Bearnson, Error Detecting Logic for Digital Computers, McGraw–Hill Co., 1968, pp. 143- 149.

*Primary Examiner*—Charles E. Atkinson

*Attorney*—Robert E. Burns and Emmanuel J. Lobato

[57] ABSTRACT

A logical system provided with a logical circuit using at least one logical element, in which the logical element performs a first logical function in response to a first control binary information and a second logical function in response to a second control binary information. Input pair signals (1,0) and (0,1) which are successive binary signal elements different from each other are applied to the logical circuit as input signals while control binary information is applied to the logical element so as to alternately perform the first logical function and the second logical function. Faults of the logical element can be detected by detecting at the output of the logical circuit a fault pair signal (1,1) or (0,0) which are successive signal elements of the same binary information.

4 Claims, 2 Drawing Figures

LOGICAL SYSTEM DETECTABLE OF FAULT OF ANY LOGICAL ELEMENT THEREIN

This invention relates to a logical system detectable of a fault of any logical element therein.

To raise the reliability of a logical system, the logical system is frequently formed into a double system provided with parallelly operating two sets performing the same operation, so that respective outputs of the two sets are always compared with each other to detect fault in response to discordance between the outputs. This fault detection system is necessary in a real-time logical system impermissible of interruption of the operation of the system caused by fault. Moreover, it is necessary that fault in this logical system of double sets is detectable in a very short time. However, if the interruption of the operation of the system for repairing the fault is permissible in rare cases, it is desirable from an economical point of view to avoid the logical system of dual sets as mentioned above.

An object of this invention is to provide a logical system to meet with the above-mentioned requirement without use of such double sets.

In accordance with the principle of this invention, particular sets of successive two binary signal elements to indicate logical variables are used in the logical operation in this system. The particular sets of successive two binary signal elements are each indicated by a set of binary signals $(x_1,x_2)$ (hereinafter called as "pair signal") by the use of binary variable, $x_1$ and $x_2$ by way of example. In this case, it is assumed that a first character and the second character within the parentheses ( ) are called as a first signal and a second signal which are actually applied in this order to a logical element in this logical system. In this case, the pair signal has usually four possible states (0,0), (0,1), (1,0) and (1,1). In the system of this invention, however, only two states selected from the four states are used in the normal condition of the system to represent binary information "0" and "1" by the states (0,1) and (1,0) respectively, while other two states (0,0) and (1,1) are used as signals for indicating fault (hereinafter called as "-fault signal"). Accordingly, the pair signals (0,1) and (1,0) are employed as binary information for performing logical operation in the normal condition while the output of a logical element becomes the pair signal (0,0) or (1,1) in a case of fault of the logical element, so that the fault of the logical element can be detected by utilizing a fact that the pair signal (0,0) or (1,1) obtained from the fault logical element is transmitted to the output of the logical system.

Figure 1:
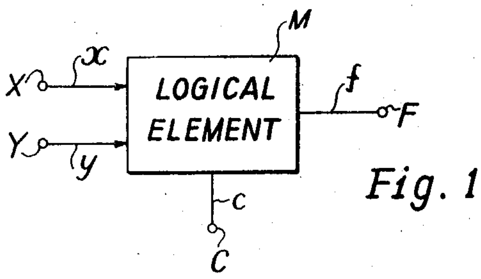
Figure 2:
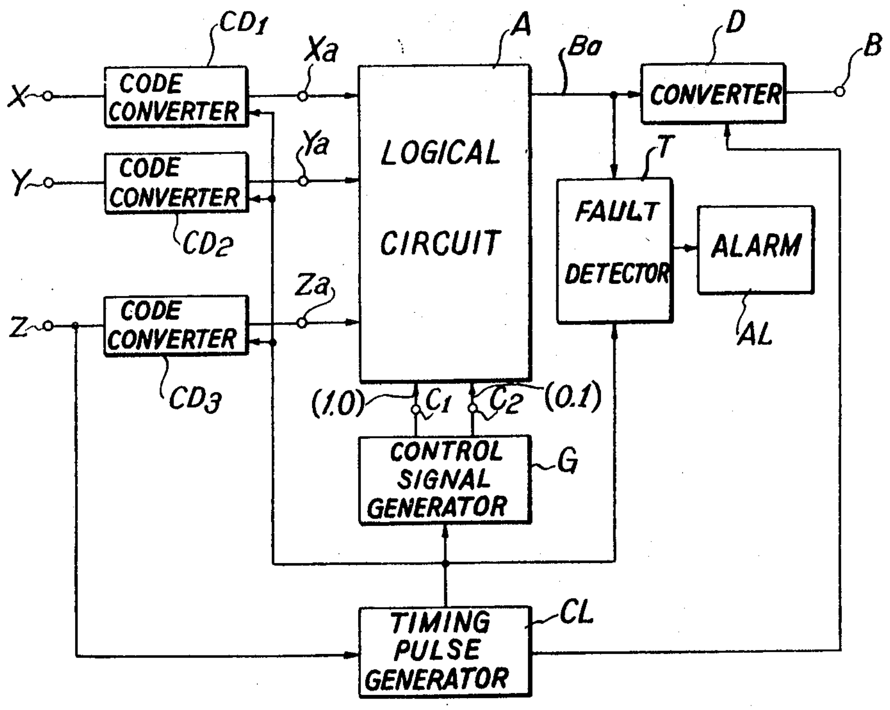

The principle, construction and merits of the system of this invention will be better understood from the following more detailed discussion in conjunction with the accompanying drawings, in which:

FIG. 1 is a block diagram explanatory of a logical element used in the system of this invention; and FIG. 2 is a block diagram illustrating an embodiment of the system of this invention.

With reference to FIG. 1, an example of a logical element used in the logical system of this invention will first be described. A logical element M shown in FIG. 1 has two input terminals X and Y receiving input binary signals $x$ and $y$ respectively, an output terminal F sending out an output binary signal $f$ and a control terminal C receiving a control signal $c$. The logical element M produces a logical sum $x+y$ of the two inputs $x$ and $y$ as the output signal $f$ in a case where the control signal $c$ assumes a state "1." On the other hand, the logical element M produces a logical product $x.y$ as the output signal $f$ in a case where the control signal $c$ assumes a state "0." In other words, the logical element M performs logical sum and logical product of the input signals $x$ and $y$ in response to the states 1 and 0 of the control signal $c$ respectively.

In the above condition, if two pair signals (1,0) and (0,1) are respectively applied to the input terminals X and Y while a control signal (1,0) or (0,1) is applied to the control terminal C in synchronism with the input signals (1,0) and (0,1), the logical element M alternately performs logical sum and logical product of the binary information (1,0) and (0,1) as mentioned in details below.

It is now assumed that two pair signals $(x_1,x_2)$ and $y_1,y_2)$ are respectively applied to the input terminals X and Y. In this case, if the control signal (1,0) is applied to the control terminal C in synchronism with the two pair input signals, the output $f$ assumes a logical sum $x_1+y_1$ of the first signals $x_1$ and $y_1$ since the control signal $c$ assumes the state 1, while the output $f$ assumes a logical product $x_2.y_2$ of the second signals $x_2$ and $y_2$ since the control signal $c$ assumes the state 0. Accordingly, the logical element M produces an output pair signal $(x_1+y_1, x_2.y_2)$ in response to the two pair signals $(x_1,x_2)$ and $(y_1,y_2)$. Namely, the output pair signal $f_{or}$ can be indicated as follows:

$$f_{or}=(x_1+y_1, x_2.y_2) \quad (1)$$

On the other hand, if the control signal (0,1) is applied to the control terminal C in synchronism with the two pair input signals, the output $f$ assumes a logical product $x_1.y_1$ of the first signals $x_1$ and $y_1$ since the control signal $c$ assumes the state 0, while the output $f$ assumes a logical sum $x_2+y_2$ of the second signals $x_2$ and $y_2$ since the control signal $c$ assumes the state 1. Accordingly, the logical element M produces an output pair signal $(x_1.y_1, x_2+y_2)$ in response to the two pair signals $(x_1, x_2)$ and $(y_1, y_2)$. Namely, the output pair signal $f_{and}$ in this case can be indicated as follows:

$$f_{and}=(x_1.\ y_1, x_2+y_2) \quad (2)$$

In view of the above Equations (1) and (2), output pair signals $f_{or}$ and $f_{and}$ obtained from respective combinations of the two input pair signals $(x_1, x_2)$ and $(y_1, y_2)$ are shown in Table 1.

TABLE 1

| $(x_1, x_2)$ | $(y_1, y_2)$ | $f_{or}$ | $f_{and}$ |
|---|---|---|---|
| (0,1) | (0,1) | (0,1) | (0,1) |
| (0,1) | (1,0) | (1,0) | (0,1) |
| (1,0) | (0,1) | (1,0) | (0,1) |
| (1,0) | (1,0) | (1,0) | (1,0) |

It is understood from Table 1, the logical element M performs conventional logical sum and logical product of two pair signals (1,0) and (0,1) regarded as binary information 1 and 0 respectively.

To perform an optional logical operation of two pair signals (1,0) and (0,1), logical negation is necessary in addition to the logical sum and the logical product. The logical negation of a pair signal $(x_1, x_2)$ can be indicated as follows:

$$f_{not}=(\bar{x}_1, \bar{x}_2) \quad (3)$$

In this case, references $\bar{x}_1$ and $\bar{x}_2$ are representative of logical nagations (NOT) of the signals $x_1$ and $x_2$ respectively. From the equation (3), it is understood that the logical nagation $f_{not}$ can be performed by performing nagation of the first and second signals. This means that the logical negation $f_{not}$ of a pair signal can be performed by a conventional NOT logical element.

In the following, a fault condition where the pair signals (1,0) and (0,1) handled in a logical circuit using at least one logical element M as mentioned above are converted to a pair signal (0,0) or (1,1) transmitted to the output of the logical circuit will be described. In this case, a fault condition of the logical element M is assumed as a first condition (hereinafter called as "first fault") where the output $f$ of the logical element M is fixed as a state 0 i.e.; a pair signal (0,0) or a state 1 i.e.; a pair signal (1,1) irrespective of the states of the input signals and the control signal and as a condition (hereinafter called as "second fault") where the function of the logical element is fixed to either the logical sum or the logical product irrespective of the states of the control signal. Even if any logical element is adopted as the logical element M, the system of this invention can be constructed by the use of such logical element if main fault of the logical element can be defined as the first fault and the second fault.

At first, the first fault will be described. If a logical element in the logical circuit causes this first fault, this logical element produces a pair signal (0,0) or (1,1) irrespective of the states of the input pair signals and the control signals. In a case where this logical element is a logical element positioned at the last stage of the logical circuit, this output pair signal (0,0) or (1,1) becomes the output of the logical circuit as it is and is employed as the fault signal. In a case where the logical element causing the first fault is not a logical element positioned at the last stage of the logical circuit, the fault signal (0,0) or (1,1) is applied to one of the two inputs of the logical element of an immediately succeeding stage. The output pair signal $f_{or}$ or $f_{and}$ of the logical element of the immediately succeeding stage is determined in accordance with the Equations (1) and (2) as follows:

| $(x_1, x_2)$ | $(y_1, y_2)$ | $f_{or}$ | $f_{and}$ |
|---|---|---|---|
| (0,1) | (0,0) | (0,0) | (0,1) |
| (0,1) | (1,1) | (1,1) | (0,1) |
| (1,0) | (0,0) | (1,0) | (0,0) |
| (1,0) | (1,1) | (1,0) | (1,1) |

As shown in Table 2, if one of the two inputs is a pair signal (0,0) or (1,1) while the other of the two inputs is a pair signal (0,1), a fault signal (0,0) or (1,1) is transmitted in a case of the logical sum $f_{or}$. On the other hand, if the other of the two inputs is a pair signal (1,0), the logical sum $f_{or}$ becomes a pair signal (1,0) without any fault signal. However, this is a correct output, since the logical sum output $f_{or}$ assumes a state 1 e.g.; pair signal (1,0) in this case) in a case of the state 1 of one of inputs of the logical sum even if another input assumes any state 1 or 0.

In a manner similar to the above principle, if one of the two inputs is a pair signal (0,0) or (1,1) while the other of the two input is a pair signal (1,0), a fault signal (0,0) or (1,1) is transmitted in a case of the logical product $f_{and}$. If the other of the two inputs is a pair signal (0,1), the logical product $f_{and}$ assumes a correct pair signal (0,1).

Since all the logical elements in the logical circuit have function as shown in Table 2, if one of the logical elements causes fault so as to produce a fault signal (1,1) or (0,0), this fault signal (1,1) or (0,0) becomes the output of the logical circuit as it is for some of possible states of the inputs of succeeding stages. On the contrary, a correct output is produced for other of the possible state unless the output assumes a pair signal other than the pair signal (1,1) or (0,0).

Next, the second fault will now be described. The function of a logical element M causing this second fault is fixed to the logical sum or logical product as mentioned above. In this case, an output pair signal $f_{or}$ fixed to the logical sum and an output pair signal $f_{and}$ fixed to the logical product assume as follows for two input pair signals $(x_1, x_2)$ and $(y_1, y_2)$:

$$f_{or} = (x_1 + y_1, x_2 + y_2) \quad (3)$$

$$f_{and} = (x_1 \cdot y_1, x_2 \cdot y_2) \quad (4)$$

The pair signals $f_{or}$ and $f_{and}$ determined in accordance with the Equations (3) and (4) are shown in Table 3.

TABLE 3

| $(x_1,x_2)$ | $(y_1,y_2)$ | $f_{or}$ | $f_{and}$ |
|---|---|---|---|
| (0,1) | (0,1) | (0,1) | (0,1) |
| (0,1) | (1,0) | (1,1) | (0,0) |
| (1,0) | (0,1) | (1,1) | (0,0) |
| (1,0) | (1,0) | (1,0) | (1,0) |

If two input pair signals are different from each other so that one assumes a state (0,1) and the other assumes a state (1,0), the output pair signal assumes a fault signal (1,1) or (0,0). However, if two input pair signals are the same, the output pair signal assumes the same signal, as the input pair signals, which is a correct signal as mentioned above with reference to the first fault. The fault signal is transmitted to the output of the logical circuit through normal logical elements therein similarly as the first fault.

With reference to FIG. 2, an embodiment of this invention will now be described. In this embodiment, a logical circuit A comprising at least one logical element M described above with reference to FIG. 1 and at least one conventional NOT logical element and has three input terminals $X_a$, $Y_a$ and $Z_a$, an output terminal $B_a$ and two control terminals $C_1$ and $C_2$. Respective control terminals of the logical elements (M) used in the logical circuit A to perform logical sum are connected to the control terminal $C_1$. On the other hand, respective control terminals of the logical elements (M) used in the logical circuit A to perform logical product are connected to the terminal control $C_2$. Code converters $CD_1$, $CD_2$ and $CD_3$ convert respectively binary signals applied to terminals X, Y and Z to respective pair signals applied to the terminals Xa, Ya and Za so as to indicate binary information 1 and 0 by pair signals (1,0) and (0,1) respectively. A converter D reconverts output pair signals (1,0) and (0,1) obtained at the terminal Ba to binary information 1 and 0 respectively. A timing pulse generator CL receives timing pulses of input signals from an input terminal (e.g.; Z as shown) and generates clock timing pulses having a repetition frequency equal to twice the repetition frequency of the timing pulses of the input signals. This clock timing pulses are applied to the converters $CD_1$, $CD_2$, $CD_3$ and D, and further applied to a fault detector T and a control signal generator G mentioned below as a synchronous signal in this system. The fault detector T detects the fault signals (0,0) and (1,1) and indicates the occurrence of a fault by an alarm AL. A control signal generator G receives the clock timing pulses from the timing pulse generator CL and repeatedly and continuously generates pair signals (1,0) and (0,1) which are respectively applied to the terminals $C_1$ and $C_2$.

In operation, if binary signals are applied to input terminals X, Y and Z, these binary signals are converted respectively by the code converters $CD_1$, $CD_2$ and $CD_3$ so that binary information 1 and 0 correspond respectively to pair signals (1,0) and (0,1). The converted pair signals are applied to the input terminals $X_a$, $Y_a$ and $Z_a$ of the logical circuit A. In synchronism with the pair signals applied to the input terminals $X_a$, $Y_a$ and $Z_a$, pair signals (1,0) and (0,1) are respectively applied to the control terminals $C_1$ and $C_2$ from the control signal generator G so that logical elements M connected to the control terminal $C_1$ operate as OR circuits and logical element M connected to the control terminal $C_2$ operate as AND circuit. Moreover, NOT circuits perform logical NOT for the pair signals handled in the logical circuit A. As a result of the above operation, the logical circuit A performs a required logical operation for the input pair signals and produces an output pair signal at the output terminal Ba. This output pair signal is converted to a binary signal by the converter D and sent out from the output terminal B.

If one of logical elements M causes a fault, a fault signal (0,0) or (1,1) is produced at the output Ba in response to the input pair signals applied to the input terminals $X_a$, $Y_a$ and $Z_a$ irrespective of the kind of the fault (i.e.; first or second fault). The fault signal is detected by the fault detector T.

In FIG. 2, the output of the fault detector T is applied to the alarm AL only. However, this output of the alarm AL can be also utilized to safely stop the function of the logical circuit A or other positive purpose.

In the above explanation for a fault, it is assumed that only a single fault is caused in the logical circuit. In this case, the operation of the logical system is correct if a pair signal (1,0) or (0,1) is obtained at the output Ba, while a pair output signal (1, 1) or (0,0) is obtained as signal if a logical element M in the logical circuit A causes fault. Accordingly, the fault is at once detected by the fault detector T. On the other hand, if two faults are caused in a logical element M so that a pair signal (1,0) (or (0,1) is converted to a pair signal (0,1)(or (1,0)), an incorrect output is produced at the output Ba. However, since a chance where two faults as mentioned above are caused in the same logical element and these faults continues during a considerable time is extremely rare, ability of the system of this invention detectable of the single fault is sufficient in practical usage.

In the above, it is assumed that binary information 1 and 0 correspond respectively to pair signals (1,0) and (0,1). However, binary information 1 and 0 may be correspond respectively to pair signals (0,1) and (1,0).

Moreover, it is assumed in the above that the logical element M performs logical sum and logical product in response to the control signals 1 and 0 respectively. However, the logical element M may be designed so as to alternately perform two functions dual to each other such as logical NOR and logical NAND, exclusive OR and coincidence etc. in addition to the above-mentioned logical sum and logical product.

What we claim is:

1. A logical system, comprising:

logical circuit means comprising at least one logical element for performing a first function in response to a first control binary information signal and performing a second logical function dual to the first logical function in response to a second control binary information signal, said logical circuit means including input means for receiving input signals, output means for providing an output signal, and control means for receiving the first and second control binary information signals, means connected to the input means of the logical circuit for converting input binary information to input pair signals (1,0) and (0,1) wherein each pair signal comprises two successive binary signal elements and wherein said pair signals are respectively representative of one and the other of two possible states of binary information;

control signal generator means connected to the control means of the logical circuit for applying at least one control train of pair signals, each including two successive signal elements different from each other, to the control means in synchronism with said input pair signals;

means connected to the output means of the logical circuit means for converting an output pair signal to binary information as an output of the system; and means connected to the output means of the logical circuit means for detecting a fault of said logical element by detecting a fault pair signal (1,1) or (0,0) of two successive signal elements of the same binary information.

2. A logical system according to claim 1, in which said logical circuit means comprises means wherein one of the first and second said functions of said logical element provides a logical sum and the other provides a logical product.

3. A logical system according to claim 1, in which the control means comprises a first control terminal and a second control terminal; the control signal generator means produces said control train which comprises a first control signal applied to the first control terminal and a second control signal applied to the second control terminal, the first control signal and the second control signal being each a train of one and the other of binary information alternately generated and having opposite phase position from each other; and the said at least one logical element is coupled to the first control terminal so as to be controlled by the first control signal, said logical circuit means including a second logical element coupled to the second control terminal so as to be controlled by the second control signal.

4. A logic system, comprising:

first and second converting means, each for converting an input binary information signal into one or the other of input pair signals (1,0) and (0,1), wherein each pair signal comprises two successive binary signal elements, and wherein said pair signals are respectively representative of one or the other of two possible states of said input binary information signal; control signal generator means for producing a train of control pair signals, each said control pair signal including two successive different signal elements, logic circuit means including a logic element, first and second input means coupled respectively between said logic element and said first and second converting means, control input means coupled to said control signal generator means, and output means for producing an output pair signal upon simultaneous reception of one of said control pair signals and said input pair signals from said first and second converting means, wherein said logic element of said logic circuit means performs a first logic function in response to the first signal element of each said control pair signal and a second logic function in response to the second signal element of each control pain signal to produce said output pair signal as (1,0) or (0,1) depending upon the states of said input pair signals;

means connected to the output means of the logic circuit means for converting each output pair signal to binary information as an output of the system; and means connected to the output means of the logic circuit means for detecting a fault of said logic element by detecting a fault output pair signal (1,1) or (0,0) of two successive signal elements of the same binary information.